Dec. 16, 1930.  P. G. WATERLOO  1,785,662
TEMPERATURE INDICATING DEVICE
Filed May 9, 1928
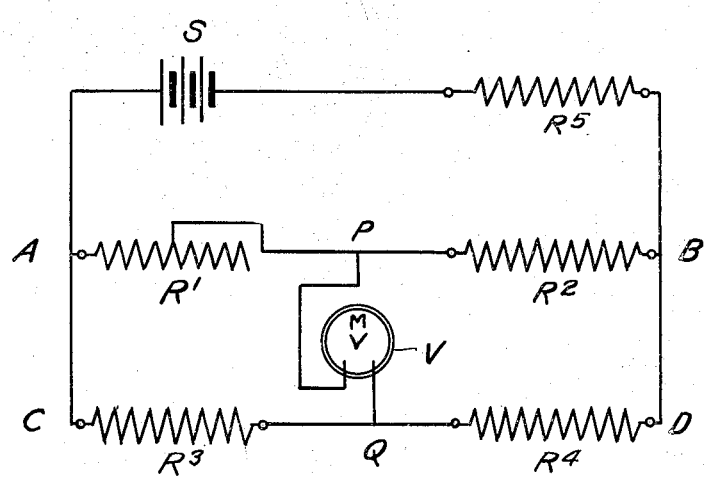
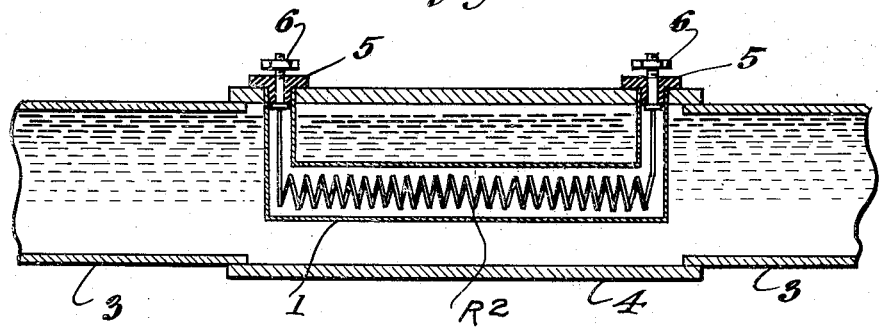
Paul G. Waterloo
INVENTOR
BY Victor J. Evans
ATTORNEY Patented Dec. 16, 1930

1,785,662

UNITED STATES PATENT OFFICE

PAUL GEORGE WATERLOO, OF MADERA, PENNSYLVANIA

TEMPERATURE-INDICATING DEVICE

Application filed May 9, 1928. Serial No. 276,358.

The temperature indicating devices heretofore used on motor cars to measure the temperature of the water or cooling medium have depended upon for their operation the expansive properties of mercury, or alcohol when heated. This has sometimes been a very crude and unreliable method, and also had the disadvantage that they were located on the motor car in such a position that it was sometimes difficult to obtain a reading.

My device overcomes these difficulties in that it is more accurate, and reliable due to being electrically operated, and as it may be mounted anywhere such as on the instrument board is more convenient to read. Thus it overcomes the disadvantages of former types.

A particular embodiment of my device is shown in the accompanying drawings, in which:

Figure 1 is a plan view of the electrical connections.

Figure 2 is a sectional view through a conductor of a water cooling system, showing the arrangement of one of the resistances therein.

The device consists of two fixed resistances R3, and R4 which are made of a suitable metal which will not change in resistance as their temperature changes.

The resistances R3, and R4 are 90 and 4.2 ohms respectively. The resistance R1 is also made of material similar to that used in the construction of R3, and R4 so that its resistance will not change with changes in temperature. R1 is a variable resistance and by changing the value of R1 the device may be compensated for any inaccuracies in the values of the other resistances.

The resistances R2, and R5 are of 2 ohms and 5 ohms respectively. They are made of suitable metal so that their resistance will change with changes of temperatures.

S is an electrical battery which energizes the device, and on the motor car may be the battery which supplies direct current to the other electrical devices of the car. It has a potential value of 6 volts which is the potential commonly used by motor cars.

V is the indicating device and is of such construction that it responds to very small potentials. In the present device the indicating hand is actuated by the mechanism of a millivoltmeter, which has a full scale value of 100 millivolts.

In practice the operation is as follows: Current flows from the battery S to points A and C. At points A and C it divides. The portion of the current flowing to A passes through resistances R1, R2 and R5, and from R5 returns to the negative terminal of the battery. The portion of the current flowing to point C passes through resistances R3, R4 and R5. From R5 the current returns to the negative terminal of the battery. Resistance R1 is then adjusted so that the circuit composed by R1, R2, R3, and R4 is balanced. When this condition of balance is reached no current will flow from point P to point Q because there is no difference of potential between these two points. Therefore, the needle or hand of the indicating device remains at zero. This condition of balance is assumed to be reached at a temperature of 0 degrees centigrade.

R2 is placed where it comes in contact with the water of the cooling system, and is arranged so that as the temperature of the water rises and falls the temperature of resistance R2 will rise and fall. Resistance R2 is protected from actual electrical contact with the water by a thin brass shell 1 (Fig. 2). The heat of the water adjacent to the brass shell is transmitted to the resistance R2.

The cooling system includes a sectional conduit 3 connected by a union 4 provided adjacent the ends thereof with openings to receive the ends of the shell 1 and the latter includes a hollow tubular body provided at the ends with angularly disposed branches fitting within the openings of the union and receives plugs 5 of insulating material carrying binding posts 6 that are connected to the ends of the resistance R2 located in the shell 1. The resistance R2 is spaced from the shell 1 and has the ends thereof extending through the angularly disposed branches for connection with the binding posts.

The condition of the resistances R1, R2, R3, and R4 at 0 degrees centigrade is one of balance. However, with the heating of R2 this condition is disturbed, as R2 is constructed of such material that an increase in its temperature produced a corresponding rise in resistance. The potential between points P and B is equal to the potential between Q and D at a temperature of 0 degrees centigrade. Therefore, as the potential between points A and P is equal to the potential between C and Q at a temperature of 0 degrees centigrade; then no current flows between points P and Q through the indicating device V, as there is no difference of potential between these two points to cause such a flow of current. With the heating of resistance R2 by the rise in temperature of the water a current flows from point P to point Q, flowing through the sensitive indicating device V and causing the indicating device V to register an increase in temperature. This flow of current takes place because resistance R2 is constructed of suitable material whose resistance rises in sympathy with a rise in temperature of the water in the cooling system. It is in accordance with well known physical laws that a resistance constructed of a pure metal such as iron will have its resistance increased when heated.

When the resistance of resistance R2 increases, a current flows from point P to point Q, and through the indicating device V. This flow of current is produced because the resistance between points P and B has risen. Therefore, the increase of potential between points P and D is able to force a current through the indicating device V and through the resistances R4 and R5 to the negative terminal of the battery. Therefore, the greater the resistance of resistance R2, which increase is caused by the heating effect of the water, the greater the current flowing from point P to point Q, the greater will be the temperature indicated by the indicator V.

The function of the resistance R5 is to keep the voltage constant and thereby also regulating the current flowing through the resistances R1, R2, R3, and R4. This is to prevent any changes in voltage of the electrical system of the motor car caused by starting and stopping of the battery generator, from changing the reading of the temperature indicating device V.

The operation of resistance R5 is as follows: Being constructed of suitable metal, such as iron, an increase in temperature will increase its resistance. Therefore, an increase in voltage of the electrical system of the motor car will have a tendency to heat the resistance R5, thereby making its resistance greater, which has the effect of maintaining the voltage supplied to the resistances R1, R2, R3, and R4 at a constant value.

Having described the invention, I claim:

In a temperature indicating apparatus for use in connection with internal combustion engines having a cooling system embodying a water conduit, a union for installation in the conduit of cylindrical form, the union having openings in its upper side and adjacent its ends, a hollow tubular body arranged within the union and provided at its ends with upwardly extending branches fitting in said openings in the union, plugs of insulating material fitted in the ends of said branches, binding posts for electrical conductor wires mounted in said plugs, and an electrical resistance element comprising a coil arranged within the said tubular body in spaced relation to the walls thereof and having its terminals extending upwardly through the branches of the body and spaced from said branches and connected with respective ones of the binding posts.

In testimony whereof I affix my signature.

PAUL GEORGE WATERLOO.